United States Patent
Waita et al.

(10) Patent No.: US 10,357,885 B2
(45) Date of Patent: Jul. 23, 2019

(54) ROBOT HAVING A BASE BODY, A SHOULDER JOINT MECHANISM ASSEMBLY, AND A MOVABLE LINK COUPLED TO THE BASE BODY THROUGH THE SHOULDER JOINT MECHANISM ASSEMBLY

(71) Applicant: HONDA MOTOR CO., LTD., Tokyo (JP)

(72) Inventors: Hironori Waita, Saitama (JP); Susumu Miyazaki, Saitama (JP); Takahide Yoshiike, Saitama (JP); Ryuma Ujino, Saitama (JP); Masao Kanazawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/042,396

(22) Filed: Feb. 12, 2016

(65) Prior Publication Data
US 2016/0236356 A1    Aug. 18, 2016

(30) Foreign Application Priority Data

Feb. 17, 2015 (JP) .................................. 2015-028966

(51) Int. Cl.
*B25J 17/00* (2006.01)
*B62D 57/032* (2006.01)

(52) U.S. Cl.
CPC ............ *B25J 17/00* (2013.01); *B62D 57/032* (2013.01); *Y10S 901/28* (2013.01)

(58) Field of Classification Search
CPC .................................................. B62D 57/032

USPC ......................................................... 180/8.1
See application file for complete search history.

(56) References Cited

U.S. PATENT DOCUMENTS 3,862,513 A  * 1/1975 Isaacson .................. A63H 3/20
                                                 273/108.22
2005/0104548 A1* 5/2005 Takenaka ............. B62D 57/032
                                                 318/568.12

FOREIGN PATENT DOCUMENTS

| JP | 11-188668 | 7/1999 |
| JP | 2009-274202 | 11/2009 |
| JP | 4774964 | 7/2011 |
| JP | 2013-248698 | 12/2013 |
| JP | 2016-052710 | 4/2016 |
| WO | 02/40226 | 5/2002 |

OTHER PUBLICATIONS

Goellner, Caleb; "Playmates Reveals 2012 Teenage Mutant Ninja Turtles Action Figures", Feb. 1, 2012; Comics Alliance, https://web.archive.org/web/20130926080115/http://comicsalliance.com/new-teenage-mutant-ninja-turtles-toys-playmates-2012/; web archive Sep. 26, 2013 accessed May 23, 2017.*

(Continued)

*Primary Examiner* — William Kelleher
*Assistant Examiner* — Gregory T Prather
(74) *Attorney, Agent, or Firm* — Rankin, Hill & Clark LLP

(57) ABSTRACT

An arm link (30) is rotatably coupled to an upper base body (10) around a yaw axis through a shoulder joint mechanism (31). A fulcrum P of rotation of the arm link (30) is located within a range of widths of the upper base body (10) in a vertical direction and a horizontal direction of the upper base body (10).

4 Claims, 8 Drawing Sheets

(56) References Cited

OTHER PUBLICATIONS

"Playmates Teenage Mutant Ninja Turtles Classic Collection Figure Review", "Pixel Dan"; Youtube, published Jul. 26, 2012; https://www.youtube.com/watch?v=DHhxFJwC4b4 ; accessed May 23, 2017; pertinent minutes 9:45 to 13:16.*
Japanese Office Action dated Jan. 8, 2019, 5 pages.

* cited by examiner

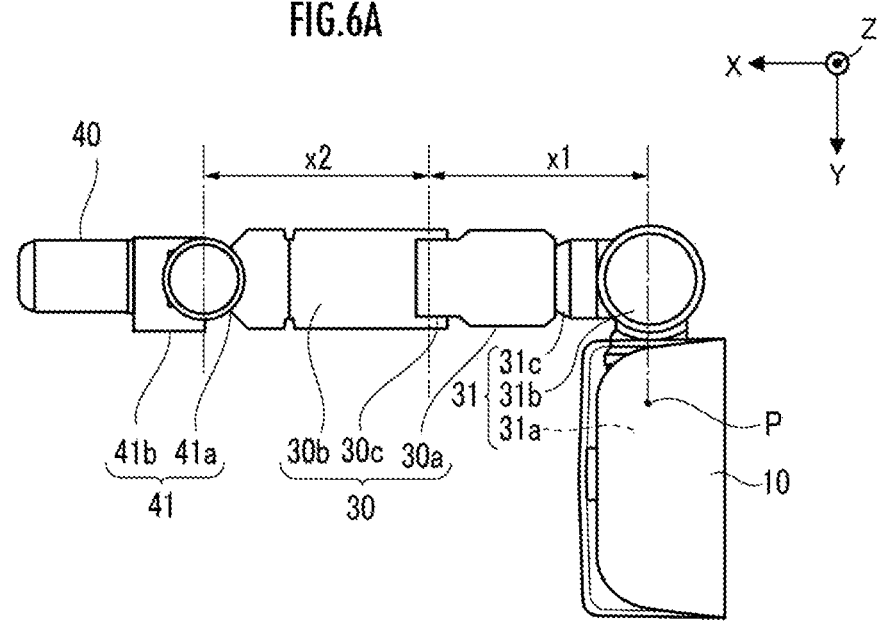
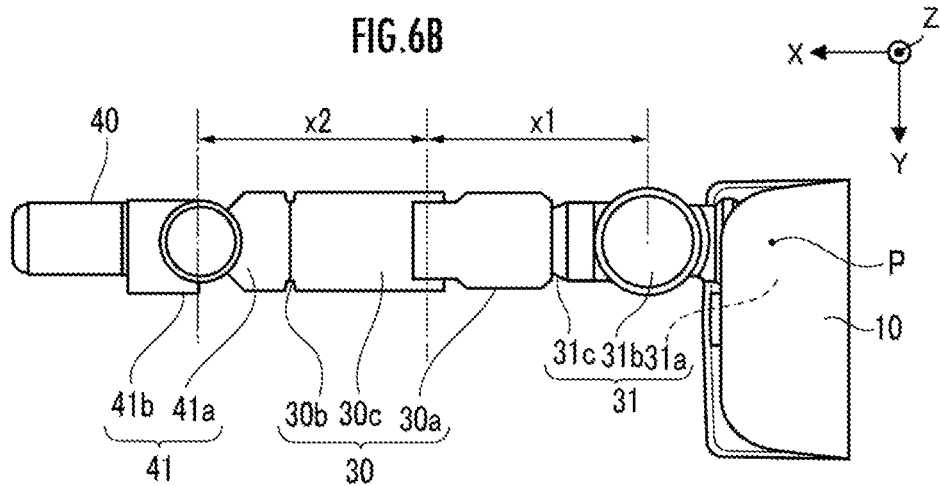

ROBOT HAVING A BASE BODY, A SHOULDER JOINT MECHANISM ASSEMBLY, AND A MOVABLE LINK COUPLED TO THE BASE BODY THROUGH THE SHOULDER JOINT MECHANISM ASSEMBLY

BACKGROUND OF THE INVENTION

Field of the Invention

The present invention relates to a robot comprising a movable link extended from a base body through a joint mechanism.

Description of the Related Art

Conventionally, there is a robot which performs various works by an end effector of a movable link coupled to a base body through a joint mechanism.

As this kind of robot, similarly to human beings, there has been known a robot comprising: a base body as a body; a head provided above the base body; right and left arm bodies extended from upper right and left sides of the base body; hands attached to end parts of the arm bodies; right and left leg bodies extended downwardly from a lower part of the base body; and foot flat parts attached to end parts of the leg bodies (for example, refer to Japanese Patent No. 4774964).

The robot described in Japanese Patent No. 4774964 can bend and stretch movable links, such as the arm bodies and the leg bodies in a plurality of joint mechanisms corresponding to joints, such as shoulder joints, elbow joints, wrist joints, a hip joint, knee joints, and ankle joints of a human being.

By the way, joint mechanisms for extending movable links from a base body are provided outside the base body in a conventional robot. For example, in the robot of Japanese Patent No. 4774964, the joint mechanisms corresponding to the shoulder joints are provided on sides of the body part which is the base body.

Therefore, in the conventional robot, there has been a problem that when work is performed using end effectors provided at the movable links, or when the robot is moved, a space for work or movement must be set also in consideration of sizes of the joint mechanisms since the sizes of the joint mechanisms in addition to a size of a base body part largely affect the work or movement.

The present invention has been made in view of the above problem, and an object thereof is to provide a robot which needs a less space required for work or movement.

SUMMARY OF THE INVENTION

In order to achieve the above-described object, a robot of the present invention comprises: a base body; a joint mechanism; and a movable link coupled to the base body through the joint mechanism, in which the joint mechanism rotatably couples the movable link to the base body, and in which a fulcrum of rotation of the movable link is located within a range of widths of the base body in a vertical direction and a horizontal direction.

Here, the "width" of the base body in the vertical direction indicates an interval from the highest position to the lowest position of the base body in a state where the robot is usually used. Similarly, the "width" of the base body in the horizontal direction indicates an interval from the forwardmost position to the rearmost position of the base body, or an interval from the rightmost position to the leftmost position of the base body in the state where the robot is usually used.

As described above, the robot is configured so that the fulcrum of rotation of the movable link is located within the range of the widths of the base body in the vertical direction and the horizontal direction, and thereby at least a part of the joint mechanism is located within the range of the widths of the base body. Hereby, a height and a width of the robot of the present invention can be more reduced than those of the conventional robot in which the whole joint mechanisms are provided outside the base body.

In addition, when the robot is configured as described above, temporarily, the height can be made low and the width of the robot can be reduced by moving the part of the joint mechanism and the movable link.

For example, when the movable link is located on a side of the base body and rotates around a yaw axis, or when the movable link is located on an upper side of the base body and rotates around a pitch axis, the movable link can be moved to a front side or a rear side of the base body. In addition, when the movable link is located on the side of the base body and rotates around a roll axis, the movable link can be moved from the side of the base body to the upper side thereof.

Therefore, according to the robot of the present invention, the height and the width can be more reduced than those of the conventional robot even in a state where the movable link is not rotated. In addition, the height and the width of the robot can also be temporarily further reduced by moving a part of the joint mechanism and the movable link. Therefore, there needs a less space required for work or movement of the robot.

In addition, in a case of the robot in which the base body rotates around a central axis line extending in an up and down direction, according to the present invention, a position of the center of gravity of the joint mechanism having large weight is located closer to a center of the base body compared to that of the conventional robot, and thus a moment of inertia caused by the joint mechanism at the time of rotation of the base body is reduced.

Therefore, according to the robot of the present invention, control of operation of the robot becomes easy since an effect of the moment of inertia is small. In addition, since a load applied to a portion of the base body which holds the joint mechanism becomes small, lives of components configuring each part of the robot can be lengthened.

In addition, in the robot of the present invention, in the joint mechanism, the movable link is preferably rotatably coupled to the base body so that the whole movable link moves to the front, the rear, an upper side, or a lower side of the base body from a reference posture in which the movable link is located at the side of the base body.

An end effector for performing various works is attached to the movable link. Consequently, if the robot is configured as described above, a tip position of the movable link can be moved to a further position in a direction after the movement. As a result, a range in which the robot can work can be increased compared to the conventional robot.

For example, in a case of a configuration in which the movable link rotates around the yaw axis, and in which the movable link is located on the side of the base body at the time of the reference posture, the whole movable link is configured to be able to be moved to the front or the rear of the base body, and thereby the end position of the movable link can be moved more to the front or to the rear of the base body. Hereby, the range in which the robot can work can be increased compared to the conventional robot.

In addition, in the robot of the present invention, the movable link has a plurality of link parts, and a joint part arranged between the adjacent link parts, and the central axis line of rotation of the movable link with respect to the base body is preferably inclined to the vertical direction or the horizontal direction of the base body.

When the movable link has the plurality of link parts and the joint parts, each link part may be in a state of being coaxial (a so-called singular point state or singular point attitude). In this state, operation of either of the joint parts is restricted, and operation performance of an end part of the movable link may be deteriorated.

Consequently, as described above, if the central axis line of the rotation of the movable link with respect to the base body (i.e., the central axis line of the rotation of the movable link in the joint mechanism) is inclined with respect to the vertical direction or a perpendicular direction of the base body, it becomes easy to avoid a situation causing the singular point state, even when the movable link is positioned at a position (for example, a front surface, a back surface, a side surface, or an upper surface of the base body) in a case where the robot performs usual work. As a result, smooth operation performance of the movable link can be secured.

In addition, in the robot of the present invention, the movable link has the plurality of link parts, and a drive part which relatively rotates one of the adjacent link parts with respect to the other, and the drive part is preferably located on a base body side of the movable link in a state of the reference posture where the movable link is located on a side of the base body.

Since a combination of a drive source such as an actuator, and a reducer, etc. is generally used for the drive part, the drive part is relatively large in size as a member included in the movable link, and comes into contact with an external environment at the time of movement of the robot, etc. in many cases. Consequently, as described above, if the robot is configured so that the drive part is located on the base body side of the movable link in the state of the reference posture, it becomes easy to avoid contact of the drive part with the external environment.

In addition, the robot of the present invention comprises: a plurality of movable links; and a plurality of joint mechanisms which couple each of the movable links to a base body rotatably in a same direction, in which each of the movable links has: a first link part coupled to the base body through the joint mechanism; and a second link part which is rotatably coupled to the first link part and in which an end effector is provided, and in which a length of the first link part in an axial direction is preferably shorter than that of the second link part in an axial direction.

The robot may move by rotation of the movable links. For example, when end effectors which hold an object are provided at end parts of the movable links, the robot may move by the rotation of the movable links and operation of the end effectors of the movable links. At the time of such movement, the movable links might come into contact with the external environment when the movable links operate.

For example, when the robot is a humanoid, and goes up a ladder while rotating each link around the pitch axis in shoulder joints, elbow joints, and wrist joints, the elbow joints might come into contact with rungs of the ladder.

Consequently, as described above, if the first link part coupled to the base body (i.e., close to a fulcrum of rotation) is configured to be shorter than the second link part located at a tip side of the first link part, spaces for movement of the movable links required to move the end effectors can be suppressed. As a result, even if the robot moves through a narrow passage or goes up a back basket ladder, it becomes easy to avoid contact with the external environment.

BRIEF DESCRIPTION OF THE DRAWINGS

FIGS. 6A and 6B are plan views each showing a structure around the shoulder joint mechanism of the robot of FIG. 1, FIG. 6A shows a state where an arm link is not rotated with respect to an upper base body, and FIG. 6B shows a state where the arm link is rotated with respect to the upper base body;

FIG. 7A shows a state where the robot of FIG. 1 holds the same rung with his hand parts of right and left arm links, and FIG. 7B shows a state where the robot of FIG. 1 holds different rungs with his hand parts of the right and left arm links.

DETAILED DESCRIPTION OF THE PREFERRED EMBODIMENT

Hereinafter, an embodiment of a robot according to the present invention will be explained with reference to drawings. A robot 1 of the embodiment is a humanoid, and is configured to be able to move while switching between a bipedal walking mode and a quadrupedal walking mode.

However, the robot in the present invention is not limited to the humanoid configured as described above, but robots each having a mode different from the robot 1 of the embodiment are also included if they are robots comprising: a base body; a joint mechanism; and a movable link coupled to the base body through the joint mechanism, such as other industrial robots.

Figure 1:
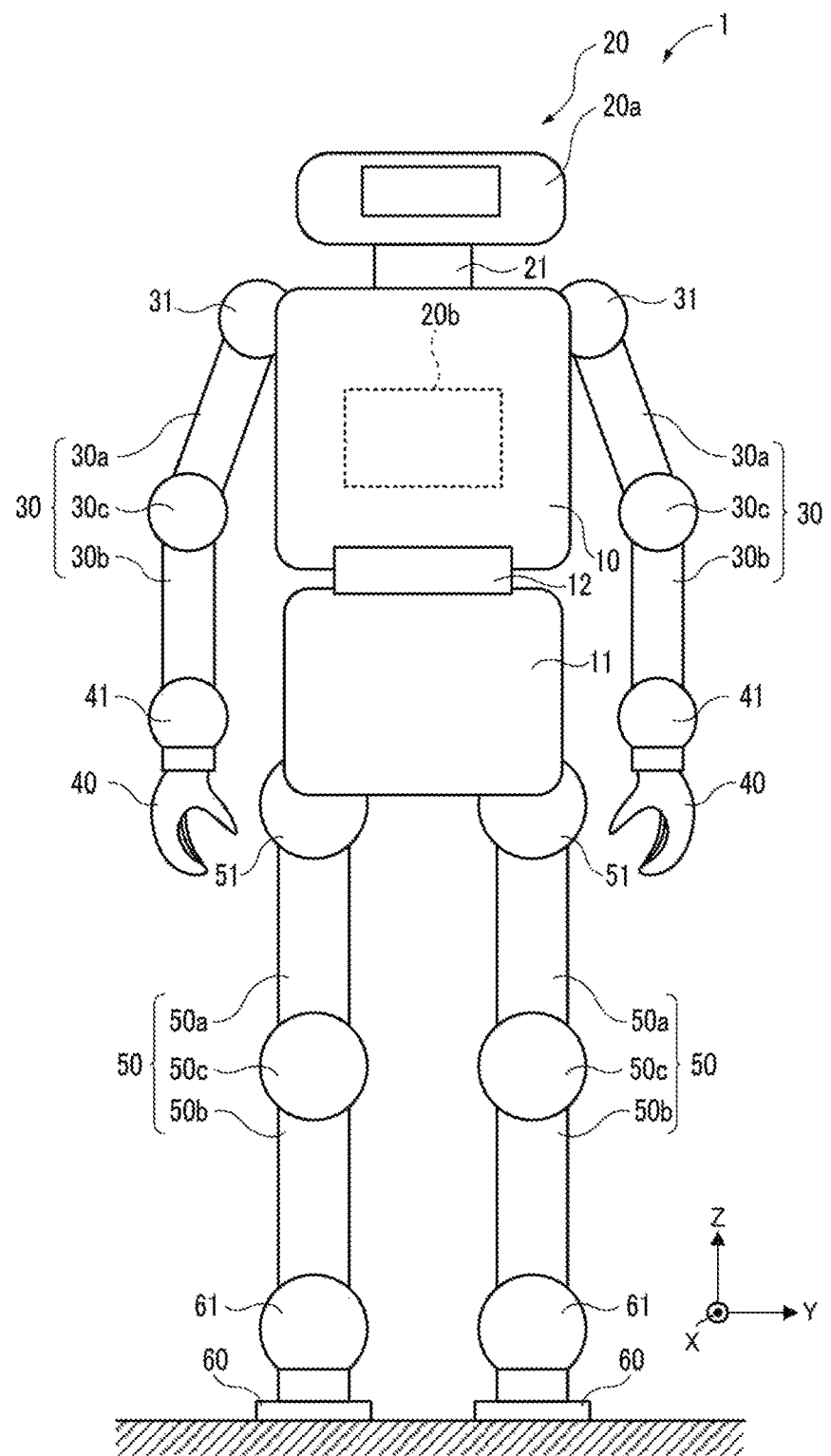
FIG. 1 is an front view schematically showing a configuration of a robot according to an embodiment of the present invention.

First, a configuration of the robot 1 of the embodiment will be explained with reference to FIG. 1.

A body of the robot 1 includes: an upper base body 10; a lower base body 11 arranged below the upper base body 10; and a waist joint mechanism 12 provided between the upper base body 10 and the lower base body 11. The upper base body 10 and the lower base body 11 are relatively rotatably coupled to each other through the waist joint mechanism 12 corresponding to a human waist joint.

A head of the robot 1 is an environment recognition unit 20a of an environment recognition device 20 for recognizing a surrounding environment. The environment recognition unit 20a is rotatably coupled to the upper base body 10 through a neck joint mechanism 21 corresponding to a human neck joint.

A camera for imaging an external environment and a sensor for recognizing a distance to the external environment is mounted in the environment recognition unit 20*a*. The camera and the sensor are controlled by an environment recognition unit control circuit 20*b* arranged inside the upper base body 10.

Note that since the robot 1 of the embodiment is the humanoid, the environment recognition unit 20*a* corresponding to a human head is provided above the upper base body 10. However, the environment recognition unit of the robot of the present invention is not limited to such a configuration, and it may be provided at a position other than an upper part of the upper base body (for example, the front of the upper base body) according to a usage environment of the robot, etc.

Right and left arm bodies of the robot 1 are a pair of arm links 30 (movable links) extended from upper right and left sides of the upper base body 10. Each arm link 30 is rotatably coupled to the upper base body 10 through a shoulder joint mechanism 31 corresponding to a human shoulder joint.

The arm link 30 includes: a first arm link part 30*a* (a first link part) corresponding to a human upper arm; a second arm link part 30*b* (a second link part) corresponding to a human forearm; and an elbow joint mechanism 30*c* corresponding to a human elbow joint.

The first arm link part 30*a* is rotatably coupled to the upper base body 10 through the shoulder joint mechanism 31. The second arm link part 30*b* is rotatably coupled to the first arm link part 30*a* through the elbow joint mechanism 30*c*. A hand part 40 corresponding to a human hand is coupled to a tip end of the second arm link part 30*b*.

Note that in the robot 1 of the embodiment, the arm link 30 as the arm body includes: the first arm link part 30*a*; the second arm link part 30*b*; and the elbow joint mechanism 30*c*. However, the arm body of the robot of the present invention is not limited to such a configuration, and it may have a single link part, or may have three or more link parts, and a plurality of joint parts which couple each link part.

The hand part 40 is one example of an end effector. The hand part 40 is rotatably coupled to the second arm link part 30*b* of the arm link 30 through a wrist joint mechanism 41 corresponding to a human wrist joint. In the robot 1 of the embodiment, the hand part 40 and the arm link 30 are included in a robot arm as a manipulator.

Right and left leg bodies of the robot 1 are a pair of right and left leg links 50 extended downwardly from a lower part of the lower base body 11. Each leg link 50 is independently rotatably coupled to the lower base body 11 through a hip joint mechanism 51 corresponding to a human hip joint.

The leg link 50 includes: a first leg link part 50*a* corresponding to a human thigh; a second leg link part 50*b* corresponding to a human lower thigh; and a knee joint mechanism 50*c* corresponding to a human knee joint.

The first leg link part 50*a* is rotatably coupled to the lower base body 11 through the hip joint mechanism 51. The second leg link part 50*b* is rotatably coupled to the first leg link part 50*a* through the knee joint mechanism 50*c*. A foot flat part 60 corresponding to a human foot is coupled to a tip end of the second leg link part 50*b*.

Note that in the robot 1 of the embodiment, the leg link 50 as the leg body includes: the first leg link part 50*a*; the second leg link part 50*b*; and the knee joint mechanism 50*c*. However, the leg body of the robot of the present invention is not limited to such a configuration, and it may have a single link part, or may have three or more link parts, and a plurality of joint parts which couple the each link part.

The foot flat part 60 is rotatably coupled to the second leg link part 50*b* of the leg link 50 through an ankle joint mechanism 61 corresponding to a human ankle joint.

Next, degrees of freedom of joint mechanisms of the robot 1 of the embodiment will be explained with reference to FIG. 2.

Note that in explanation of the embodiment, a direction in which each joint mechanism rotates each member will be explained on the basis of an posture in which no joint mechanism rotates the member coupled thereto (hereinafter referred to as a "reference posture"), unless otherwise noted. In a case of the robot 1 of the embodiment, the reference posture is a state where the robot 1 stands straight (a state where the upper base body 10, the lower base body 11, each arm link 30, and each leg link 50 are extended substantially in a vertical direction).

Figure 2:
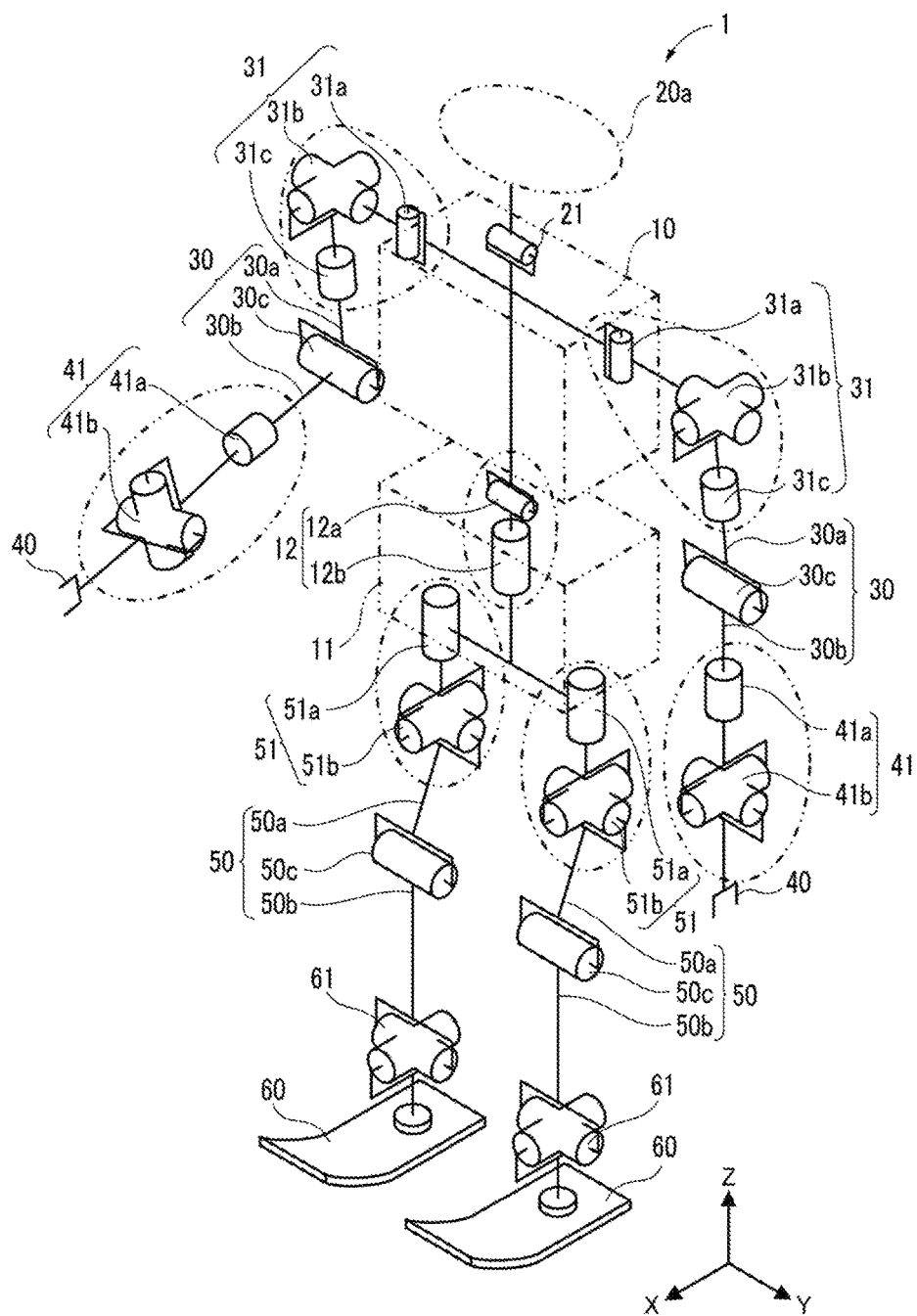
FIG. 2 is a perspective view schematically showing degrees of freedom of joint mechanisms of the robot of FIG. 1.

In addition, in the explanation of the embodiment, a yaw axis, a pitch axis, and a roll axis denote an axis in the vertical direction (a Z-axis), an axis in a right and left direction (a Y-axis), and an axis in a front and rear direction (an X-axis) respectively, in a case of the reference posture of the robot 1 as shown in FIG. 2. In this case, the yaw axis is a trunk axis of the upper base body 10 and the lower base body 11.

The waist joint mechanism 12 includes: a first waist joint mechanism 12*a* arranged below the upper base body 10; and a second waist joint mechanism 12*b* arranged between the first waist joint mechanism 12*a* and the lower base body 11.

The first waist joint mechanism 12*a* rotatably couples the upper base body 10 with the lower base body 11 and the second waist joint mechanism 12*b* around the pitch axis. The second waist joint mechanism 12*b* rotatably couples the upper base body 10 and the first waist joint mechanism 12*a* with the lower base body 11 around the yaw axis.

The neck joint mechanism 21 rotatably couples the environment recognition unit 20*a* with the upper base body 10 around the pitch axis.

The elbow joint mechanism 30*c* of the arm link 30 rotatably couples the second arm link part 30*b* corresponding to the human forearm with the first arm link part 30*a* corresponding to the human upper arm around the pitch axis.

The shoulder joint mechanism 31 includes: a first shoulder joint mechanism 31*a* arranged so as to be located within a range of widths of the upper base body 10 in the vertical direction and a horizontal direction; a second shoulder joint mechanism 31*b* arranged on a side of the first shoulder joint mechanism 31*a* and outside the upper base body 10; and a third shoulder joint mechanism 31*c* arranged between the second shoulder joint mechanism 31*b* and the first arm link part 30*a* of the arm link 30.

Here, the "width" of the base body in the vertical direction indicates an interval from the highest position to the lowest position of the base body in a state where the robot is usually used. Similarly, the "width" of the base body in the horizontal direction indicates an interval from the forwardmost position to the rearmost position of the base body, or an interval from the rightmost position to the leftmost position of the base body in the state where the robot is usually used.

The first shoulder joint mechanism 31*a* rotatably couples the second shoulder joint mechanism 31*b* with the upper base body 10 around the yaw axis. The second shoulder joint mechanism 31*b* rotatably couples the third shoulder joint mechanism 31*c* with the first shoulder joint mechanism 31*a* around the pitch axis and the roll axis. The third shoulder joint mechanism 31*c* rotatably couples the arm link 30 with the second shoulder joint mechanism 31*b* around the yaw axis.

The wrist joint mechanism 41 includes: a first wrist joint mechanism 41a arranged at the hand part 40 side of the second arm link part 30b of the arm link 30; and a second wrist joint mechanism 41b arranged between the first wrist joint mechanism 41a and the hand part 40.

The first wrist joint mechanism 41a rotatably couples the second wrist joint mechanism 41b with the second arm link part 30b around the yaw axis. The second wrist joint mechanism 41b rotatably couples the hand part 40 with the first wrist joint mechanism 41a around the roll axis and the pitch axis.

The knee joint mechanism 50c of the leg link 50 rotatably couples the second leg link part 50b corresponding to a human lower limb with the first leg link part 50a corresponding to the human thigh around the pitch axis.

The hip joint mechanism 51 includes: a first hip joint mechanism 51a arranged below the lower base body 11; and a second hip joint mechanism 51b arranged on the leg link 50 side of the first hip joint mechanism 51a.

The first hip joint mechanism 51a rotatably couples the second hip joint mechanism 51b with the lower base body 11 around the yaw axis. The second hip joint mechanism 51b rotatably couples the leg link 50 with the first hip joint mechanism 51a around the pitch axis and the roll axis.

The ankle joint mechanism 61 rotatably couples the foot flat part 60 with the second leg link part 50b around pitch axis and the roll axis.

Note that configurations of a waist joint mechanism, a neck joint mechanism, an elbow joint mechanism, a wrist joint mechanism, a knee joint mechanism, a hip joint mechanism, and an ankle joint mechanism in the robot of the present invention are not limited to the above-described configurations, and that they may be appropriately changed according to applications of the robot or arrangement spaces of joints in the robot. For example, any of the joint mechanisms may be omitted, or a joint mechanism other than the above-described joint mechanisms may be added.

Next, two walking modes of the robot 1 of the embodiment will be explained with reference to FIGS. 3 and 4. Note that illustration of the arm link 30 is omitted in FIG. 3 in order to facilitate understanding.

Note that in the explanation of the embodiment, "bringing the hand part 40 or the foot flat part 60 into contact with the ground" means that the hand part 40 or the foot flat part 60 is brought into contact with the external environment so as to receive a contact reaction force which resists a force acting on the robot 1.

Figure 3:
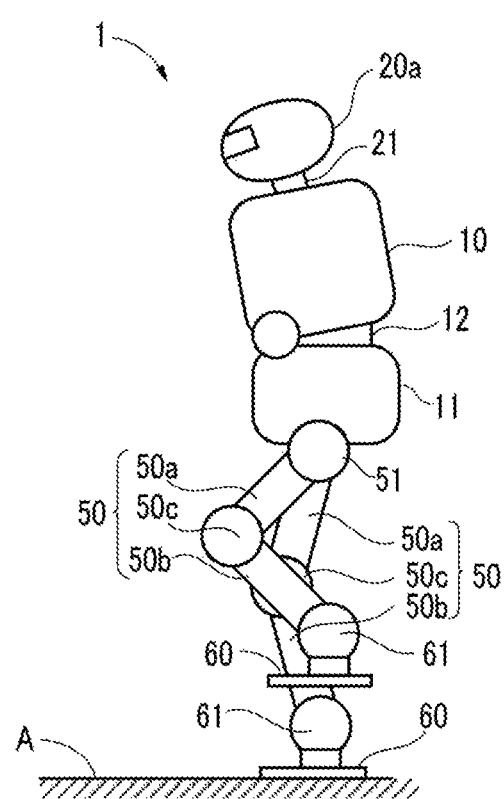
FIG. 3 is a side view showing a state where the robot of FIG. 1 is moving in a bipedal walking mode.

As shown in FIG. 3, in the bipedal walking mode, in a state where the foot flat part 60 of a tip end of one of the pair of leg links 50 is brought into contact with the ground A (a state where the one leg link 50 is used as a support leg), such operation is repeated that the foot flat part 60 of a tip end of the other leg link 50 is moved in the air, and is further brought into contact with the ground A (the other leg link 50 is made to operate as a swing leg). In this case, operation of the respective leg links 50 as the swing legs are alternately performed. In addition, the arm links 30, whose illustration is omitted, each are in a non-contact state with the ground A.

Figure 4:
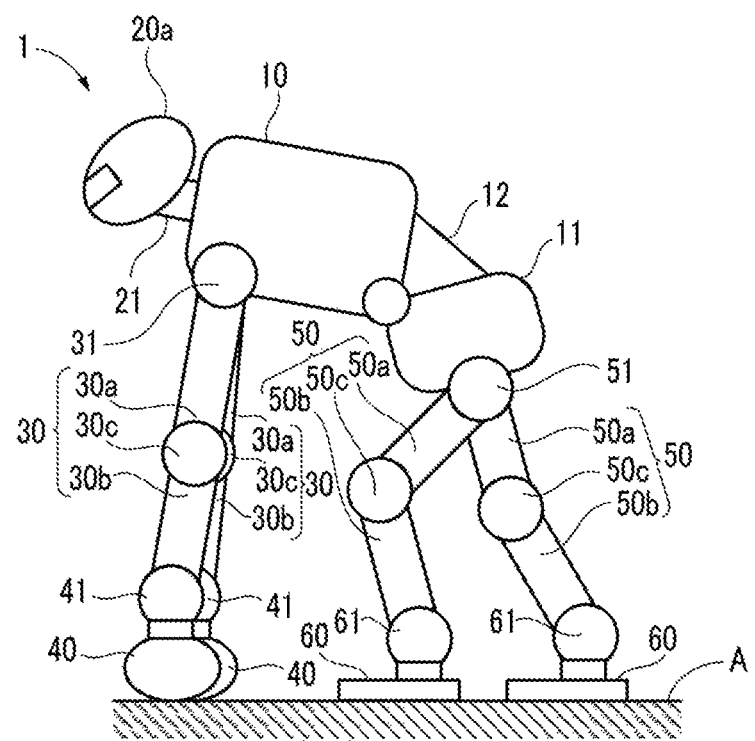
FIG. 4 is a side view showing a state where the robot of FIG. 1 is moving in a quadrupedal walking mode.

As shown in FIG. 4, in the quadrupedal walking mode, in a state where two or three of the hand parts 40 of the end parts of the arm links 30 and the foot flat parts 60 of the end parts of the leg links 50 are brought into contact with the ground A (a state where the two or three of the arm links 30 and the leg links 50 are used as the support legs), such operation is repeated that the remaining two or one hand part(s) 40 or foot flat part(s) 60 are (is) moved in the air, and are (is) further brought into contact with the ground A (the remaining two or one arm link(s) 30 or leg link(s) 50 are (is) made to operate as the swing leg(s)). In this case, the arm link 30 or the leg link 50 made to operate as the swing leg is periodically switched by a predetermined rule.

However, operation of the quadrupedal walking mode is not limited to the above-described operation. For example, in a state where one of the hand parts 40 of the end parts of the arm links 30 and the foot flat parts 60 of the end parts of the leg links 50 is brought into contact with the ground A (a state where the one hand part 40 or foot flat part 60 is used as the support leg), it is also possible to repeat such operation that the remaining three hand parts 40 and foot flat part 60 are moved in the air, and are further brought into contact with the ground A (the remaining three hand parts 40 and foot flat part 60 are made to operate as the swing legs).

In addition, it is also possible to repeat such operation that the hand parts 40 of the end parts of the arm links 30 and the foot flat parts 60 of the end parts of the leg links 50 are moved in the air all at once (i.e., the robot 1 is made to jump), and are further brought into contact with the ground.

Next, configurations of the arm link 30, the shoulder joint mechanism 31, and the wrist joint mechanism 41 of the robot 1 of the embodiment will be explained in detail with reference to FIGS. 5 to 7. Note that in FIGS. 5 and 6, in order to facilitate understanding, only a portion corresponding to a human chest is shown in the upper base body 10, and only the right arm link 30 and the right hand part 40 are shown.

Figure 5:
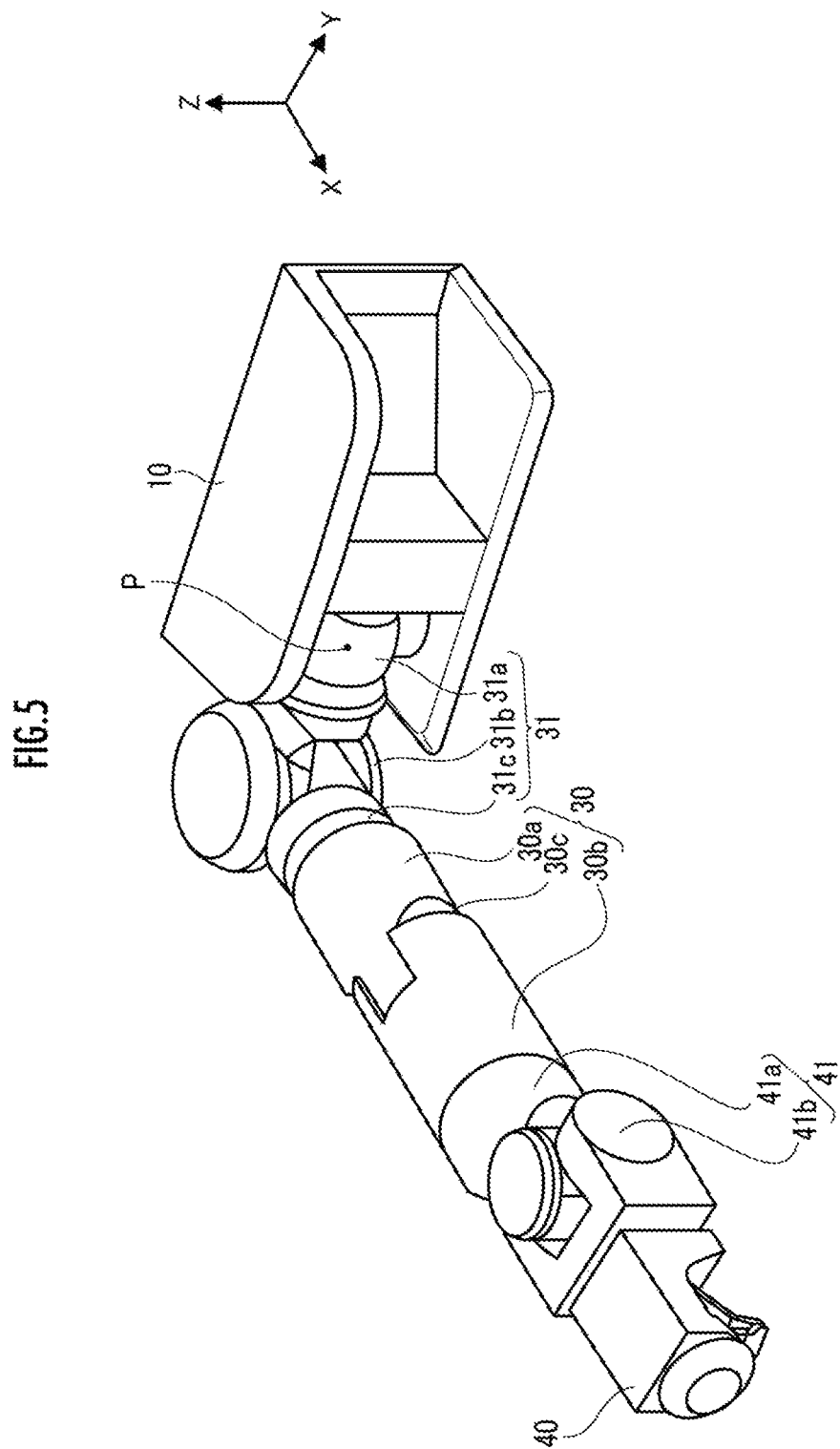
FIG. 5 is a perspective view showing structures of a shoulder joint mechanism and an arm body of the robot of FIG. 1.

As shown in FIG. 5, the first shoulder joint mechanism 31a which makes the arm link 30 rotatable with respect to the upper base body 10 around the yaw axis is configured so that a fulcrum P of rotation of the arm link 30 around the yaw axis is located within the range of the width of the upper base body 10 in the vertical direction (a Z-axis direction) and the width of the upper base body 10 in the horizontal direction (an X-axis direction and a Y-axis direction).

Namely, since in the robot 1, the first shoulder joint mechanism 31a, which is a part of the shoulder joint mechanism 31, is located within the range of the widths of the upper base body 10, a width of the robot 1 at the time of the reference posture is smaller than that of the conventional robot in which all shoulder joint mechanisms (all fulcrums of rotation of arm links) are located outside a base body.

In addition, in the robot 1 of the embodiment, the upper base body 10 can rotate around the yaw axis, which is the trunk axis, with respect to the lower base body 11 by the second waist joint mechanism 12b of the waist joint mechanism 12 (refer to FIG. 2). In a case of such a configuration, a moment of inertia caused by the joint mechanism when the upper base body 10 rotates is largely affected by a position of the center of gravity of the joint mechanism having large weight.

However, since the first shoulder joint mechanism 31a, which is the part of the shoulder joint mechanism 31 of the robot 1 of the embodiment, is located within the range of the widths of the upper base body 10, a position of the center of gravity of the shoulder joint mechanism 31 is located closer to the trunk axis than in the conventional robot in which all the shoulder joint mechanisms are located outside the base body.

Therefore, in the robot 1 of the embodiment, an effect of the moment of inertia when the upper base body 10 rotates with respect to the lower base body 11 or the whole robot 1 rotates around the yaw axis is smaller than that of the conventional robot. As a result, control of operation of the robot 1 is easier than that of the conventional robot. In addition, the robot 1 of the embodiment has a smaller load applied to a portion which holds the waist joint mechanism 12. As a result, lives of components included in each part of the robot 1 are longer than those of the conventional robot.

As shown in FIG. 6A, in the robot 1, when the hand part 40 attached to the tip end of the arm link 30 is positioned in front of the upper base body 10 (on a left side of the paper in FIG. 6A), such a method can be used that the arm link 30 is rotated around the pitch axis only by the second shoulder joint mechanism 31b which is located outside the upper base body 10 among mechanisms included in the shoulder joint mechanism 31. This method is used also in the conventional robot.

In addition, as shown in FIG. 6B, in the robot 1, in a similar case, such a method can also be used that after the arm link 30 is rotated around the pitch axis by the second shoulder joint mechanism 31b which is located outside the upper base body 10 among the mechanisms included in the shoulder joint mechanism 31 (after the arm link 30 is set to be a state of FIG. 6A), further, the arm link 30 is rotated around the yaw axis by the second shoulder joint mechanism 31b, and the arm link 30 is rotated around the yaw axis by the first shoulder joint mechanism 31a arranged so as to be located within the range of the widths of the upper base body 10 in the vertical direction and the horizontal direction.

As described above, since the robot 1 is configured so that the whole arm links 30 can be moved from a side surface of the upper base body 10 where the arm links 30 are located at the time of the reference posture to a front surface of the upper base body 10, the robot 1 can perform operation corresponding to shrug of a human action, and the width of the robot 1 can be temporarily reduced.

In addition, as is apparent from FIGS. 6A and 6B, in the robot 1, in a case where the hand part 40 attached to the end part of the arm link 30 is positioned in front of the upper base body 10, the hand part 40 can be positioned even at a position similar to a position in the conventional robot (set to the state of FIG. 6A), and the hand part 40 can be positioned even at a position further away from the base body than a position in the conventional robot (set to a state of FIG. 6B). Therefore, a work range of the robot 1 of the embodiment can be increased compared to the conventional robot.

In addition, as shown in FIG. 5, the arm link 30 rotatably coupled to the upper base body 10 through the shoulder joint mechanism 31 has the elbow joint mechanism 30c corresponding to the human elbow joint between the first arm link part 30a corresponding to the human upper arm and the second arm link part 30b corresponding to the human forearm.

A drive part (not shown) for relatively rotating the first arm link part 30a and the second arm link part 30b is arranged inside the elbow joint mechanism 30c. Since the drive part is a combination of a drive source such as an actuator, and a reducer, etc., it is relatively large in size as a member included in the arm link 30.

Consequently, the robot 1 is configured so that the drive part is located on the upper base body 10 side of the arm link 30 at the time of the reference posture, and thereby contact of the drive part with the external environment is avoided.

In addition, as shown in FIGS. 6A and 6B, a length x1 of the first arm link part 30a of the arm link 30 in an axial direction is formed to be shorter than a length x2 of the second arm link part 30b of the arm link 30 in the axial direction. The length x1 is a distance from a central axis line of the second shoulder joint mechanism 31b which rotates the first arm link part 30a around the pitch axis to a central axis line of the elbow joint mechanism 30c. In addition, the length x2 is a distance from the central axis line of the elbow joint mechanism 30c to a central axis line of the second wrist joint mechanism 41b which rotates the second arm link part 30b around the pitch axis.

Figure 7A:
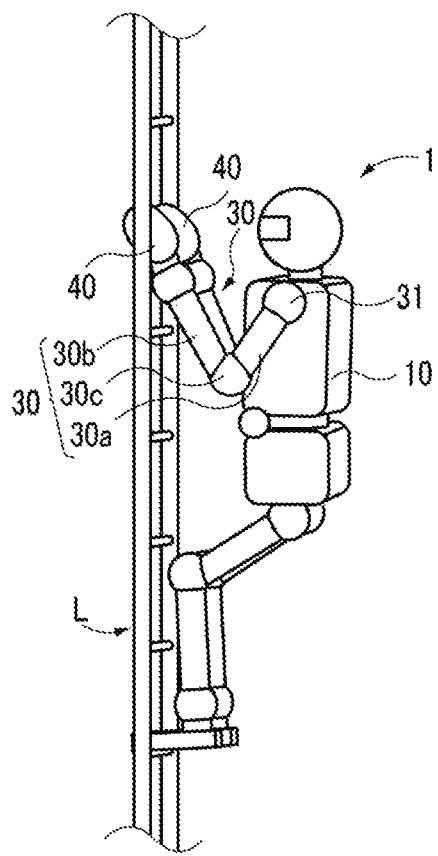
FIGS. 7A and 7B are perspective views each exemplifying a state where the robot of FIG. 1 is performing operation to go up a ladder.
Figure 7B:
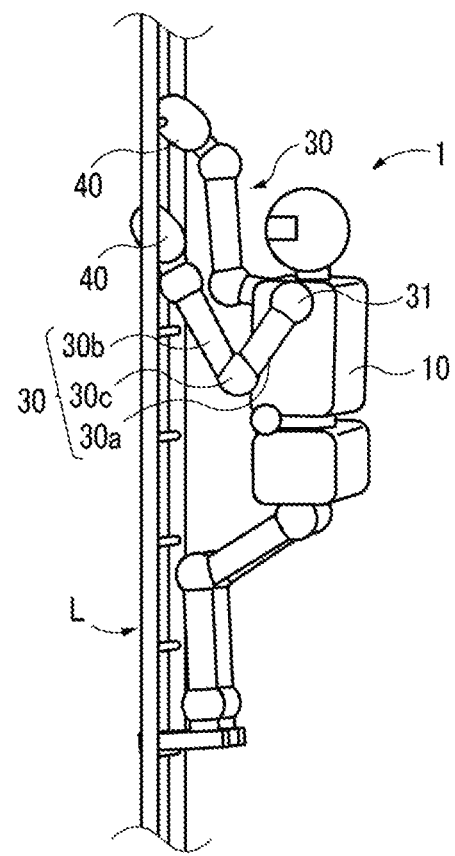

Since the robot 1 is configured as described above, the robot 1 can easily avoid contact of the elbow joint mechanisms 30c with the external environment, when performing rotation around the pitch axis in the shoulder joint mechanism 31, rotation around the pitch axis in the elbow joint mechanism 30c, and rotation around the pitch axis in the wrist joint mechanism 41 (for example, when performing operation of gripping rungs of a ladder L and going up the ladder L using the hand parts 40 attached to the end parts of the arm links 30 as shown in FIGS. 7A and 7B).

For example, when the robot 1 goes up the ladder L, first, as shown in FIG. 7A, the robot 1 becomes a state of gripping the same rung by the hand parts 40 of the end parts of the right and left arm links 30. After that, as shown in FIG. 7B, the robot 1 moves only one arm link 30 upwardly, and grips a rung above a rung gripped by the hand part 40 of the other arm link 30 by the upwardly moved hand part 40 of the arm link 30.

When the robot 1 moves the arm link 30 as described above, the shorter a length of the first arm link part 30a corresponding to the human upper arm is, the smaller a projection amount of the elbow joint mechanism 30c to the front of the upper base body 10 at the time of movement of the arm link 30 becomes (i.e., the smaller a radius of a trajectory in rotation of the elbow joint mechanism 30c centering on the shoulder joint mechanism 31 becomes smaller).

Therefore, when a movement amount of the hand part 40 in the vertical direction is the same, the shorter the length x1 of the first arm link part 30a is than a length of the second arm link part 30b, more easily contact of the elbow joint mechanism 30c with the external environment (the rungs of the ladder L) can be avoided.

Note that a similar configuration may be employed also in the leg link 50 in addition to the arm link 30. In that case, the first leg link part 50a near the lower base body 11 may be formed to be shorter than the second leg link part 50b.

By the way, the robot 1 of the embodiment is configured so that a central axis line of rotation in each joint mechanism is substantially parallel to the vertical direction and the horizontal direction of the upper base body 10 and the lower base body 11 at the time of the reference posture (refer to FIG. 2).

When the robot 1 is configured as described above, the arm link 30 has the first arm link part 30a, the second arm link part 30b, and the elbow joint mechanism 30c, and thus the first arm link part 30a and the second arm link part 30b may become a state of being coaxial (a so-called singular point state or singular point attitude).

Since operation of the elbow joint mechanism 30c is restricted in this state (i.e., since a state must be maintained where the first arm link part 30a and the second arm link part 30b are aligned in a straight line), the arm link 30 can rotate only by the shoulder joint mechanism 31 and the wrist joint mechanism 41, and operation performance of the hand part 40 attached to the end part of the arm link 30 deteriorates.

Consequently, if the central axis line of the rotation of the arm link 30 with respect to the upper base body 10 (i.e., the central axis line of the rotation of the arm link 30 in the shoulder joint mechanism 31) is inclined with respect to the vertical direction or the perpendicular direction of the upper base body 10, smooth operation performance of the end part (i.e., the hand part 40) of the arm link 30 can be secured since it becomes easy to avoid a situation causing the singular point state, even when the arm link 30 is positioned at a position in a case where the robot 1 performs usual work (for example, a front surface, a back surface, a side surface, or an upper surface of the upper base body 10).

Figure 8:
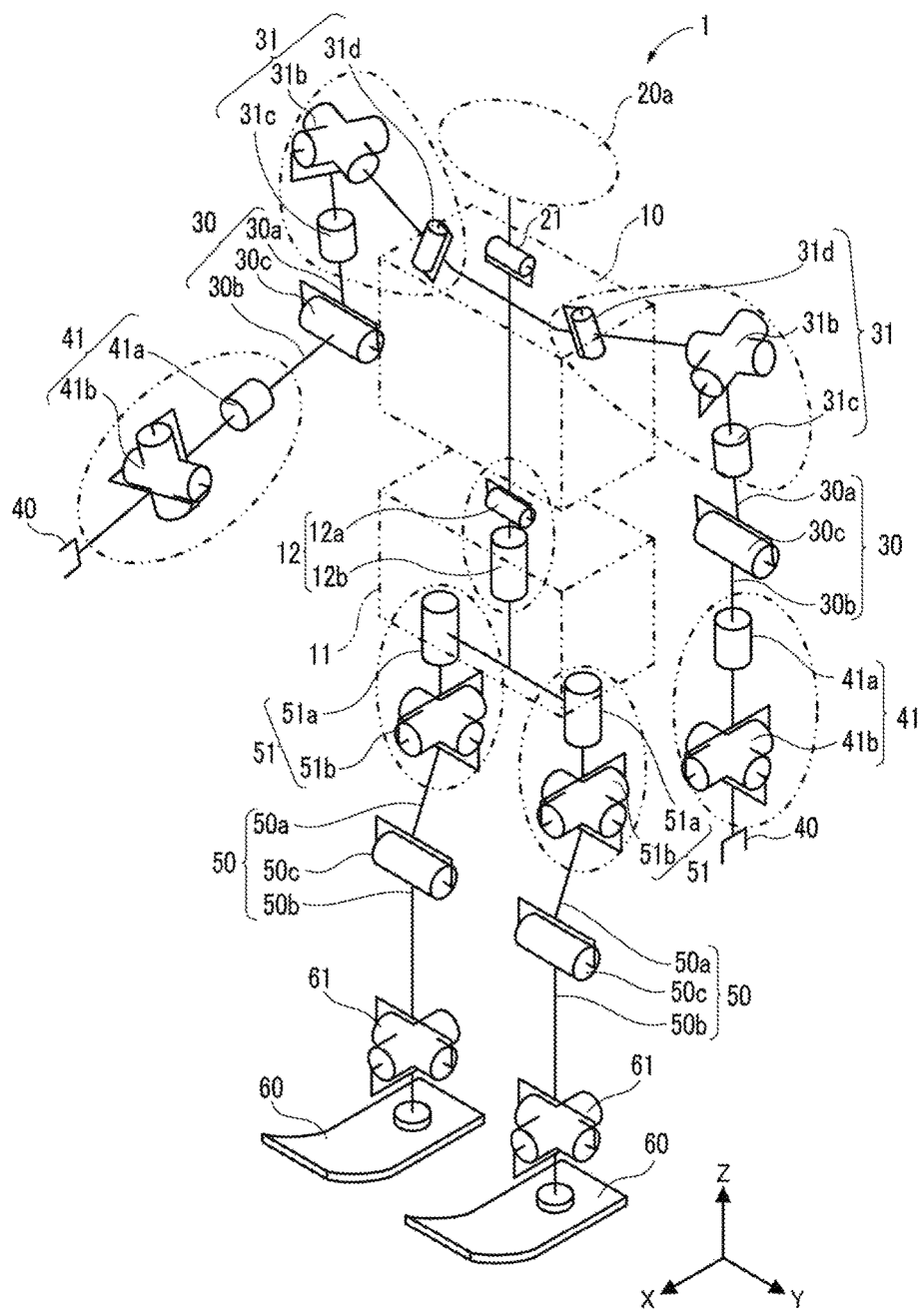
FIG. 8 is a perspective view schematically showing a configuration of degrees of freedom of a robot according to a modified example of the embodiment of the present invention.

For example, as in a modified example of the above-described embodiment shown in FIG. 8, if the robot 1 is configured so that a central axis line of rotation in the first shoulder joint mechanism 31d of the shoulder joint mechanism 31 is inclined with respect to the Y-axis or the Z-axis, the first arm link part 30a and the second arm link part 30b of the arm link 30 do not align in a straight line (the arm link 30 does not become the singular point state) even if the hand part 40 is moved so as to be the furthest away in the side of the upper base body 10, and thus smooth operation performance of the hand part 40 can be secured.

In addition, as described above, the robot 1 of the embodiment is the humanoid, and is configured to be able to move while switching between the bipedal walking mode and the quadrupedal walking mode.

A height of the whole robot 1 can be more reduced in the quadrupedal walking mode than the bipedal walking mode. In addition, even in the quadrupedal walking mode, similarly to the bipedal walking mode, if the whole first arm link part 30a is rotated around the first shoulder joint mechanism 31d, and the whole arm link 30 is moved to a lower part side of the base body (a front side of the base body in the bipedal walking mode), a width of the robot 1 in the horizontal direction can be reduced.

In addition, since a degree of freedom of rotation in the shoulder joint mechanism 31 is higher than that of the conventional robot, roughness of the ground can be easily absorbed by the arm link 30 in the quadrupedal walking mode. As a result, a position of the environment recognition unit 20a as the head can be stabilized.

Therefore, in the robot 1, for example, also when the robot 1 moves through a narrow place, smooth movement which was not able to be performed by the conventional bipedal walking robot can be performed by switching to the quadrupedal walking mode.

Hereinbefore, although the illustrated embodiment has been explained, the present invention is not limited to such an embodiment.

For example, in the above-described embodiment, the robot 1 is configured so that the fulcrum P of the first shoulder joint mechanism 31a which rotates the arm link 30 around the yaw axis among the mechanisms included in the shoulder joint mechanism 31 is located within the range of the widths of the upper base body 10. However, the robot of the present invention is not limited to such a configuration, and it may have a configuration in which a joint mechanism located within a range of widths of a base body makes a coupled movable link rotatable around a pitch axis or a roll axis.

In addition, although in the above-described embodiment, the robot 1 is configured so that the drive part is located on the upper base body 10 side at the time of the reference posture of the robot 1, the present invention is not necessarily limited to such a configuration, and an arrangement position of a drive source may be appropriately changed according to a shape of a robot, a size of the drive source, etc.

In addition, in the above-described embodiment, the robot 1 is configured so that the length of the first arm link part 30a of the arm link 30 in the axial direction is shorter than that of the second arm link part 30b thereof. However, the robot of the present invention is not limited to such a configuration, and the lengths of the first link part and the second link part of the movable link may be set to be the same to each other, or the length of the first link part in the axial direction may be set to be longer than that of the second link part in the axial direction.

In addition, in the above-described embodiment, the length x1 of the first arm link part 30a and the length x2 of the second arm link part 30b have been explained on the basis of the central axis line around the pitch axis. However, the robot of the present invention is not limited to such a configuration, and the lengths of the first link part and the second link part may be set on the basis of the central axis lines of their rotation according to directions of the rotation.

REFERENCE SIGNS LIST 1 robot
10 upper base body
11 lower base body
12 waist joint mechanism
12a first waist joint mechanism
12b second waist joint mechanism
20 environment recognition device
20a environment recognition unit
20b environment recognition unit control circuit
21 neck joint mechanism
30 arm link (movable link)
30a first arm link part (first link part)
30b second arm link part (second link part)
30c elbow joint mechanism (joint part)
31 shoulder joint mechanism
31a, 31d first shoulder joint mechanism
31b second shoulder joint mechanism
31c third shoulder joint mechanism
40 hand part
41 wrist joint mechanism
41a first wrist joint mechanism
41b second wrist joint mechanism
50 leg link
50a first leg link part
50b second leg link part
50c knee joint mechanism
51 hip joint mechanism
51a first hip joint mechanism
51b second hip joint mechanism
60 foot flat part
61 ankle joint mechanism
A ground
L ladder
P fulcrum of rotation of arm link 30 around yaw axis
x1 length of first link
x2 length of second link

What is claimed is:

1. A humanoid robot comprising:
a base body;
a pair of leg link parts each coupled at one end to the base body via a hip joint mechanism and at an opposite end to a foot flat part, the foot flat part being configured to contact a ground surface;
a pair of shoulder joint mechanism assemblies; and
a pair of movable links each rotatably coupled to the base body through a respective one of the pair of shoulder joint mechanism assemblies,
wherein each of the pair of shoulder joint mechanism assemblies comprises a first shoulder joint mechanism disposed inside the base body and rotatably coupled to the base body, and a second shoulder joint mechanism protruding from the base body and rotatably coupled to the first shoulder joint mechanism at one end and a respective one of the pair of movable links at another end, wherein a fulcrum of rotation of each of the movable links is an axis of rotation of the first shoulder joint mechanism associated therewith inside the base body, the axis of rotation of the first shoulder joint mechanism being a yaw axis of the robot oriented in a vertical direction of the humanoid robot, the vertical direction of the humanoid robot extending between the foot flat part and an upper end of the base body when the robot is in a reference posture, wherein the reference posture is a state in which the humanoid robot stands straight with the foot flat part contacting the ground surface and the base body aligned over the pair of leg link parts with the hip joint mechanism in a neutral position with substantially no bend, wherein each second shoulder joint mechanism is movable between a first position at which the second shoulder joint mechanism is extended in a longitudinal direction of the robot, and a second position at which the second shoulder joint mechanism is extended laterally outwardly in a width direction of the robot, by rotation of the first shoulder joint mechanism associated with the second shoulder joint mechanism around the axis of rotation of the first shoulder joint mechanism associated with the second shoulder joint mechanism, wherein the vertical direction of the robot is perpendicular to the longitudinal direction of the robot and the width direction of the robot, and the longitudinal direction of the robot is perpendicular to the width direction of the robot.

2. The humanoid robot according to claim 1, wherein each of the pair of movable links comprises a first movable link part coupled to the base body through the respective one of the pair of shoulder joint mechanism assemblies and a second movable link part including an end effector rotatably coupled to the first movable link part, and a length of the first movable link part in an axial direction thereof is shorter than a length of the second movable link part in an axial direction thereof.

3. The humanoid robot according to claim 1, further comprising an actuator configured to drive each of the pair of movable links.

4. The humanoid robot according to claim 1, wherein each of the pair of movable links is rotatably coupled to the second shoulder joint mechanism of a respective one of the pair of shoulder joint mechanism assemblies so as to be rotatable about an axis of rotation of the second shoulder joint mechanism, the axis of rotation of the second shoulder joint mechanism being parallel to the axis of rotation of the first shoulder joint mechanism associated with the second shoulder joint mechanism.

* * * * *